US009203762B2

(12) United States Patent
Chawla et al.

(10) Patent No.: US 9,203,762 B2
(45) Date of Patent: *Dec. 1, 2015

(54) INFORMATION HANDLING SYSTEM DATA CENTER BRIDGING FEATURES WITH DEFINED APPLICATION ENVIRONMENTS

(71) Applicant: Dell Products L.P., Round Rock, TX (US)

(72) Inventors: Gaurav Chawla, Austin, TX (US); Hendrich M. Hernandez, Round Rock, TX (US); Jacob Cherian, Austin, TX (US); Robert Winter, Leander, TX (US); Saikrishna Kotha, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/315,820

(22) Filed: Jun. 26, 2014

(65) Prior Publication Data

US 2014/0307548 A1 Oct. 16, 2014

Related U.S. Application Data

(63) Continuation of application No. 12/688,135, filed on Jan. 15, 2010, now Pat. No. 8,780,923.

(51) Int. Cl.
*H04L 12/28* (2006.01)
*H04L 12/815* (2013.01)
*H04L 12/24* (2006.01)
*H04L 29/06* (2006.01)
*H04L 12/46* (2006.01)

(52) U.S. Cl.
CPC .......... *H04L 47/22* (2013.01); *H04L 12/4645* (2013.01); *H04L 41/0213* (2013.01); *H04L 41/0813* (2013.01); *H04L 69/26* (2013.01); *Y02B 60/43* (2013.01); *Y02B 60/44* (2013.01)

(58) Field of Classification Search
CPC ..................................................... H04L 45/00
USPC ..................................................... 370/395.31
See application file for complete search history.

(56) References Cited

U.S. PATENT DOCUMENTS 5,220,596 A 6/1993 Patel
6,973,085 B1 12/2005 Acharya
(Continued)

OTHER PUBLICATIONS

IBM Systems Information Centers, http://publib.boulder.ibm.com/infocenter/systems/index.jsp?topic=/com.ibm.aix.baseadmn/doc/baseadmndita/wlm_aptag.htm, printed Apr. 16, 2010.
(Continued)

*Primary Examiner* — Christopher R Crompton
(74) *Attorney, Agent, or Firm* — Terrile, Cannatti, Chambers & Holland, LLP; Robert W. Holland

(57) ABSTRACT

Information handling system network traffic is managed by populating a DCBX client framework with application network parameters associated with predetermined applications. Network devices, such as information handling system clients and servers, retrieve a TLV from a switch to obtain application network parameters for an application and apply the parameters so that the application executing on the device tags network communications with the associated parameters, such as bandwidth, loss less behavior, priority, latency, through put and CPU utilization.

13 Claims, 3 Drawing Sheets

(56) References Cited

U.S. PATENT DOCUMENTS

| | | | |
|---|---|---|---|
| 6,987,768 | B1 | 1/2006 | Kojima et al. |
| 7,814,495 | B1* | 10/2010 | Lim et al. ................. 718/104 |
| 8,780,923 | B2* | 7/2014 | Chawla et al. .......... 370/395.31 |
| 2002/0174419 | A1* | 11/2002 | Alvarez et al. ............. 717/168 |
| 2005/0027837 | A1* | 2/2005 | Roese et al. ................. 709/223 |
| 2007/0260733 | A1 | 11/2007 | Havemose et al. |
| 2007/0280105 | A1* | 12/2007 | Barkay et al. ............... 370/229 |
| 2008/0175239 | A1 | 7/2008 | Sistanizadeh et al. |
| 2008/0320116 | A1 | 12/2008 | Briggs |
| 2009/0013070 | A1 | 1/2009 | Srivastava et al. |
| 2009/0024992 | A1 | 1/2009 | Kulaga et al. |
| 2009/0262741 | A1* | 10/2009 | Jungck et al. ............... 370/392 |
| 2009/0296599 | A1 | 12/2009 | Ayyagari et al. |
| 2010/0169494 | A1* | 7/2010 | Machulsky et al. .......... 709/227 |
| 2010/0251234 | A1* | 9/2010 | Oshins ........................... 718/1 |

OTHER PUBLICATIONS

IEEE Standards for Local and Metropolitan Area Networks: Virtual Bridged Local Area Networks, IEEE Std 8021Q, Dec. 8, 1998.

* cited by examiner

INFORMATION HANDLING SYSTEM DATA CENTER BRIDGING FEATURES WITH DEFINED APPLICATION ENVIRONMENTS

BACKGROUND OF THE INVENTION

1. Field of the Invention

The present invention relates in general to the field of information handling system networking, and more particularly to a system and method for information handling system data center bridging features with defined application environments.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system usefulness has grown as networking capabilities have improved and allowed ready remote access to information. One example of improved networking capabilities is the faster speeds employed by more recent Ethernet networks compared with early versions of Ethernet, which operated at 10 Mbs or less. By comparison, the information technology industry is now moving towards 10 GE Ethernet. With these increased Ethernet networking speeds, interest has arisen to develop bandwidth sharing among multiple traffic types across an Ethernet link. A proposed IEEE 802.1 standard called Data Center Bridging (DCB) offers convergence of multiple types of traffic on Ethernet, such as by enabling local area network (LAN), storage area network (SAN) and IPC traffic to share bandwidth of a 10G link with improved congestion management and quality of service. For example the DCB standard allows a network administrator to configure parameters for each type of traffic sent across a network, such as parameters for priority, bandwidth, flow control and end-to-end congestion management. Configuration of parameters is managed by a standardized protocol known as the DCB Capability Exchange Protocol (DCBX). The DCBX standard enables an administrator to centrally configure parameters on a network switch. Network devices, such as servers, switches and storage, exchange parameters input at a switch using DCBX Type-Length-Value Pairs (TLVs) and end stations, such as client information handling systems, inherit configurations from the switch.

One disadvantage of the DCB specification is that TLVs are designed for Fibre Channel over Ethernet (FCoE) and iSCSI traffic by allowing administrators to centrally associate DCB parameters with Ethertype and TCP socket number. The DCB specification does not currently allow centralized configuration of other types of traffic. However, a variety of applications run on client information handling systems by communicating information over networks. One example is the use of virtual machines, which use a hypervisor during VMotion migration of virtual machines between server and client information handling systems. Another example is e-mail traffic and database traffic, which often include varying degrees of importance. Another example is management applications that manage various aspects of a network and typically have a high priority relative to other applications. Often, DCB features remain unavailable for a particular application unless the application uses an industry standard UDP or TCP socket number.

SUMMARY OF THE INVENTION

Therefore a need has arisen for a system and method which allows network features enabled through network switches for applications executing on network devices.

In accordance with the present invention, a system and method are provided which substantially reduce the disadvantages and problems associated with previous methods and systems for supporting network features through network switches. Application network parameters associated with an application are deployed from a network switch to network devices to define management of communication of information associated with an application through the network.

More specifically, an application traffic configuration module deploys application network parameters to a DCB configuration table in a network switch. For example, a network switch exchanges these configuration parameters with the end station running applications via DCBX protocol and TLVS. DCBX TLV is stored on a switch with a modified format that defines network management parameters for one or more predetermined applications. Upon detection of an interface of the switch with the network, an application traffic manager, such as a DCBX client framework, retrieves the TLV and identifies an application associated with the TLV and application network parameters included for the application in the TLV. The identified application applies the network parameters to communicate information associated with the application through the network according to the parameters. For example, a plugin operating on the application applies the application network parameters to modify the network stack used to communicate information associated with the application, such as through an operating system API.

The present invention provides a number of important technical advantages. One example of an important technical advantage is that DCB features are enabled for any application that executes on a network device, independent of whether the application executes directly over L2 Ethernet, over an L4 socket, uses RDMA or uses a proprietary protocol. Network management is supported for environments where applications cannot be identified by a predefined Ethertype or reserved socket number. Management of network traffic associated with predetermined applications is accomplished within an existing DCBX client framework by adding an extension to a TLV that identifies the application. Application based network management through a DCBX client framework enables priority and loss less behavior for virtual machine operations, such as hypervisor traffic during VMotion; priority and guaranteed bandwidth for e-mail and database traffic; priority and unlimited bandwidth for network management traffic; and DCB features configured for proprietary protocols, for node-to-node traffic in clustered storage or clustered applications for node-to-node metadata update traffic such as IPC traffic in storage devices, and for IPC messages in a distributed application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A network architecture manages network information traffic associated with an application executing on a network device, such as an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
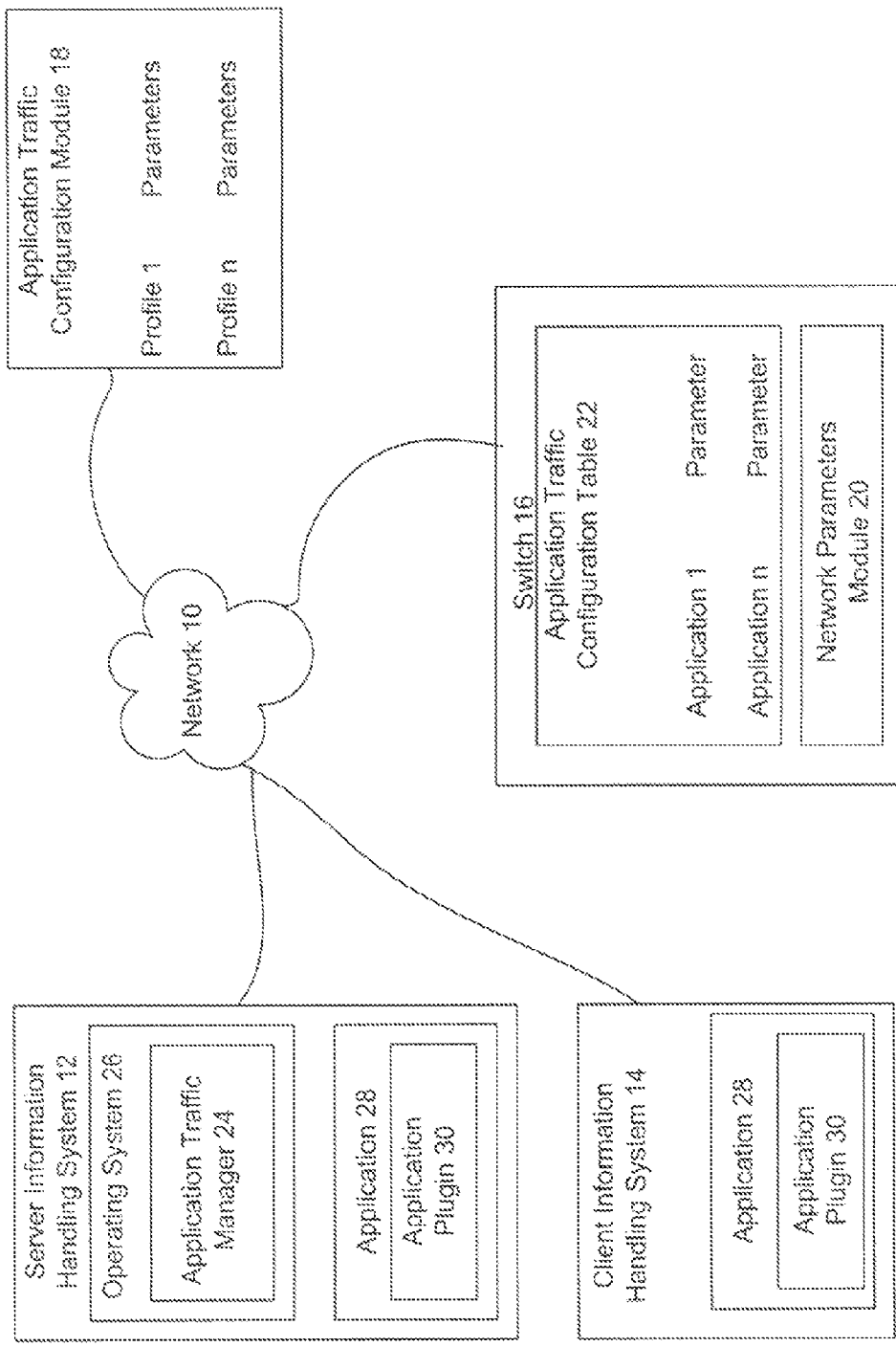
FIG. 1 depicts a block diagram of a system that manages network traffic associated with applications executing on a network device.

Referring now to FIG. 1, a block diagram depicts a system that manages network traffic associated with applications executing on a network device. A network 10 communicates information between network devices using a defined network architecture, such as Ethernet. Network 10 includes plural devices having processing components that process information, such as processors that execute applications. For example, a server information handling system 12 executes instructions to perform server functions, such as e-mail, storage or Web page hosting. A client information handling system 14 executes instructions to perform client functions, such as word processing and data retrieval for presentation to an end user. A switch 16 switches traffic between network devices based upon information in the traffic, such as an Ethernet switch that directs traffic based upon packet header information. Switch 16 includes storage, such as non-volatile memory, and a processor that executes instructions, such as firmware instructions maintained in the non-volatile storage. In one embodiment, network 10 is a 10GE Ethernet network that shares link bandwidth according to the IEEE 802.1 Data Center Bridging Standard.

In order to configure network parameters for information traffic sent through network 10 based upon the application associated with the information, an application traffic configuration module 18 interfaces through network 10 with a network parameters module 20 executing on switch 16 and populates an application traffic configuration table 22 with application network parameters for predetermined applications. For example, application traffic configuration table 22 is a DCB Capability Exchange Protocol (DCBX) table modified to accept application network parameters for predetermined applications. Application network parameters include priority associated with information of an application, bandwidth associated with information of an application provided by associating priorities with priority groups and allocating guaranteed bandwidth for each priority group, flow control associated with information of an application by using lossless versus traditional packet-drop Ethernet behavior on congestion, and end-to-end congestion management of information associated with an application. Application network parameters are centrally configured by storage of the application network parameters on application traffic configuration table 22 of switch 16 and then deployed to network devices using modified DCBX Type-Length-Value (TLV) pairs communicated from switch 16 to modules executing on the devices. In one embodiment, application traffic configuration module 18 organizes network parameters into as profiles that are assignable to applications. For example, a profile might include three predetermined parameters of latency, throughput and CPU utilization, with each parameter assigned a value of high, medium or low. To deploy network management having desired profile parameters, the predetermined profile is assigned to the application in the application traffic configuration table.

In operation, management of network information associated with an application executing on a network device is initiated upon detection of deployment of application traffic configuration table 22, such as on initial power up of switch 16 or an indication from switch 16 that table 22 has changed. An application traffic manager 24 executing on server information handling system 12, such as a plugin executing in conjunction with operating system 26 or a hypervisor or application executing on dedicated hardware, receives a TLV from switch 16 that communicates application network parameters from application traffic configuration table 22. Application traffic manager 24 parses the TLV to determine the application 28 associated with the TLV and provides tagging information to an application plugin 30, which uses the tagging information to tag packets communicated by the application 28 through network 10. Thus, application 28 communicates network information through network 10 such that all traffic from application 28 is tagged with the priority specified in the TLV. The network stack on server information handling system 12 tags all the traffic originated by application 28.

Application 28 enhances network management of network information traffic by enhancing a DCB framework to manage information independent of whether an application runs directly over an L2 Ethernet or an L4 socket interface. Management for traffic associated with a predetermined application includes priority, flow control and bandwidth reservation parameters. One example of such an application is hypervisor to hypervisor traffic during VMotion that provides high priority and loss less behavior during virtual machine migration. Another example is a high priority and guaranteed bandwidth for e-mail and database traffic. In one embodiment, network management functions receive high priority and unlimited bandwidth for specific traffic so that network managers can perform network maintenance quickly even during times of heavy network use. Application specific DCB features are available even where industry standard UDP/TCP socket numbers are not used, such as with proprietary protocols or RDMA are used. In one example, DCB features are available for high bandwidth node-to-node traffic in clustered storage or clustered applications, such as Equallogic storage. High priority and maximum bandwidth are configurable for node-to-node metadata update traffic, such as IPC traffic in Equallogic storage.

Figure 2:
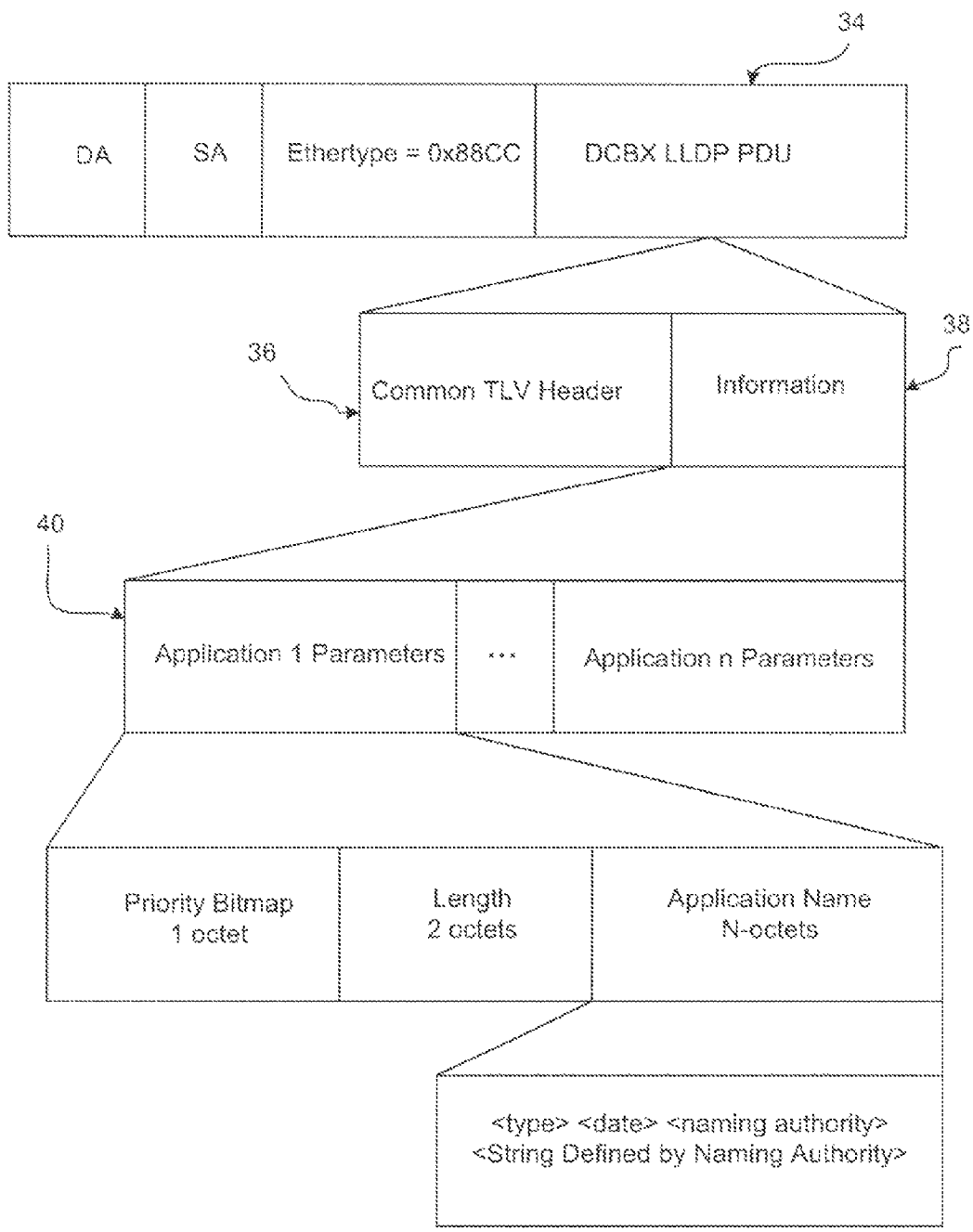
FIG. 2 depicts an example of a modified TLV frame with information that extends DCB functionality to applications.

Referring now to FIG. 2, an example of a modified TLV frame is depicted with information that extends DCB functionality to applications. An Ethernet setup frame 32 includes a DCBX LLDP PDU 34 that has TLV headers 36 with an information portion 38. Information portion 38 is modified to include application network parameters 40 that define how information associated with the identified application is communicated through a network. The frame format depicted by FIG. 2 allows a DCB client framework to configure DCB features for any application defined within the frame. Based upon the application name and priority information associated with the application name, information on the network associated with the application is managed to have a priority established through TLV's stored on a switch and distributed to the network. In the example depicted by FIG. 2, the application name combines a company domain name and application name to guarantee a unique world wide name.

Figure 3:
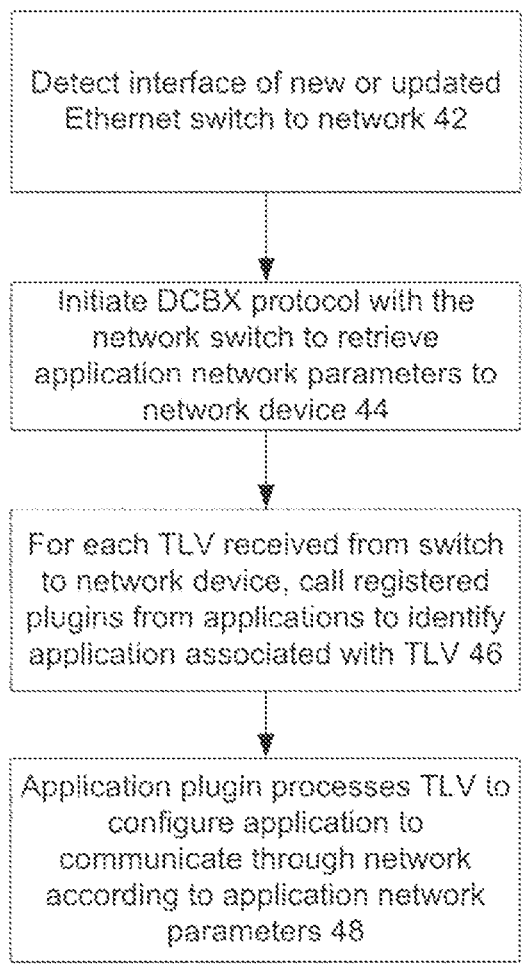
FIG. 3 depicts a flow diagram of a process for distributing an application specific TLV to a network.

Referring now to FIG. 3, a flow diagram depicts a process for distributing an application specific TLV to a network. The process begins at step 42 with detection of an interface of a new or modified switch to a network by an application traffic manager, such as a modified DCBX client framework. At step 44, the application traffic manager retrieves TLVs from the switch, including one or more TLVs having a modified information section that defines network parameters associated with an application. At step 46, the application manager 24 calls registered application traffic plugins to identify a plugin that claims each application specific TLV. The application traffic plugin associated with the application of the TLV processes the application network parameter values of the TLV to configure its associate application and underlying network stack to manage network traffic associated with the application according to the TLV. For example, operating system APIs tag application traffic using the priority indicated by the TLV.

Although the present invention has been described in detail, it should be understood that various changes, substitutions and alterations can be made hereto without departing from the spirit and scope of the invention as defined by the appended claims.

What is claimed is:

1. A system for migrating virtual machines through a network, the network having plural devices, the system comprising:
    a switch operable to interface the plural devices and to communicate application network parameters to the plural devices;
    an application traffic manager executing on one or more of the devices of the network and operable to receive the application network parameters from the switch, to identify a virtual machine associated with a migration between the network devices and to coordinate tagging of Ethernet packets of the virtual machine migration according to the application network parameters, the Ethernet packets tagged to identify hypervisor to hypervisor traffic during migration of the virtual machine from a first device to a second device.

2. The system of claim 1 further comprising an application traffic configuration table stored on the switch to establish application network parameters for plural applications.

3. The system of claim 2 wherein the application traffic configuration table has plural application network parameter profiles, each application network parameter profile selectable to enable predetermined parameters.

4. The system of claim 3 wherein the application network parameter profiles comprise a latency parameter, a throughput parameter and a CPU utilization parameter.

5. The system of claim 1 wherein the tagging of the Ethernet packets designates a loss less behavior for the tagged packets.

6. The system of claim 5 wherein the switch is further operable to communicate the tagged packets with the loss less behavior.

7. A method for managing virtual machine migration through a network having plural devices, the method comprising:
    communicating application network parameters stored on a switch to a network device interfaced with the switch, the application network parameters defining at least network behavior for migration of a virtual machine;
    determining at the network device a hypervisor associated with the application network parameters;
    processing the application network parameters to configure the hypervisor to apply the application network parameters to tag Ethernet packets associated with a virtual machine migration to have the network behavior for communication through the network; and
    migrating the virtual machine with hypervisor-to-hypervisor traffic of the migration tagged, with the Ethernet packets.

8. The method of claim 7 further comprising:
    interfacing an information handling system with the switch;
    storing updated application network parameters on the switch with the information handling system; and
    communicating the updated application network parameters from the switch to the network device for configuring an application associated with the updated application network parameters to apply the updated application network parameters to identify information associated with the application.

9. The method of claim 8 further comprising:
    defining plural application network parameter profiles, each application network parameter profile selectable to enable predetermined parameters; and
    storing a network parameter profile as the updated application network parameters.

10. The method of claim 9 wherein the application network parameter profiles comprise a latency parameter, a throughput parameter and a CPU utilization parameter.

11. The method of claim 7 further comprising:
    tagging network information associated with the virtual machine migration according to the application network parameters; and
    communicating the tagged network information through the network according to the tagging.

12. The method of claim 11 wherein the application network parameters comprises a high priority tag for packets associated with the virtual machine migration.

13. The method of claim 7 wherein the application network parameters comprise a loss less behavior for virtual machine migration information associated with the hypervisor.

* * * * *